US012784936B2

(12) United States Patent
Sharaf et al.

(10) Patent No.: US 12,784,936 B2
(45) Date of Patent: Nov. 3, 2026

(54) HIGH VOLTAGE CABLE INTEGRATED END CONNECTOR SYSTEM THAT ELIMINATES TERMINAL

(71) Applicant: FCA US LLC, Auburn Hills, MI (US)

(72) Inventors: Nadir Sharaf, Bloomfield Hills, MI (US); Daniel R Luedtke, Beverly Hills, MI (US); Jamal Alghanem, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 150 days.

(21) Appl. No.: 18/591,276

(22) Filed: Feb. 29, 2024

(65) Prior Publication Data

US 2025/0279223 A1 Sep. 4, 2025

(51) Int. Cl.

*H01R 4/02* (2006.01)
*H01B 7/02* (2006.01)
*H01B 9/00* (2006.01)

(52) U.S. Cl.

CPC ............... *H01B 9/006* (2013.01); *H01B 7/02* (2013.01)

(58) Field of Classification Search

CPC ... H01R 4/02; H01R 4/10; H01R 4/12; H01R 4/021; H01R 4/34; H01R 11/09; H01R 11/11; H01R 11/12; H01R 43/02; H01R 43/0214; H01R 43/0249; H01R 43/0207; H01R 43/04; H01R 43/28; H01B 7/009

USPC ............ 174/15.1, 74 R–88 C, 128.1; 439/98, 439/502, 587, 736, 658, 693, 755, 762, 439/768, 874, 883; 29/854, 860, 861, 29/863, 868, 869, 883–884

See application file for complete search history.

(56) References Cited

U.S. PATENT DOCUMENTS 1,751,405 A * 3/1930 Herman ................. H01R 11/12 29/874
4,038,743 A * 8/1977 DuRocher .............. H01R 4/026 228/904
4,775,337 A * 10/1988 Van Wagener ........ H01R 11/12 439/883
5,191,710 A * 3/1993 Fujimaki ................ H01R 11/12 439/502

(Continued)

FOREIGN PATENT DOCUMENTS

DE 419005 C * 5/1925 ............... H01R 9/20
EP 1973200 A1 * 9/2008 ............. H01R 11/12

(Continued)

*Primary Examiner* — William H. Mayo, III
(74) *Attorney, Agent, or Firm* — Jeremy J. Klobucar

(57) ABSTRACT

A high voltage cable includes a plurality of strands forming the cable, which has a first end and a second opposite end, the first end including a first portion and a second portion that forms a distal end of the cable. The first portion is encapsulated in insulation and the second portion is free of the insulation. The strands in the second portion are sized and shaped and fused together into a lower integrated connection terminal having a slot at the distal end, an upper face and an opposed lower face. An upper cover plate may be positioned over the integrated connection terminal in contact with the upper face, and includes an upper surface for receiving a fastener. The connection terminal consists of the fused together strands such that the first end is free from a separate lower connection terminal being welded to an end of the first portion.

10 Claims, 5 Drawing Sheets

(56) References Cited

U.S. PATENT DOCUMENTS

| | | | | | |
|---|---|---|---|---|---|
| 5,541,380 | A * | 7/1996 | Ogden | H01R 35/02 | 219/56.22 |
| 5,575,697 | A * | 11/1996 | Kaedei | H01R 11/12 | 439/868 |
| 5,960,540 | A * | 10/1999 | Pentz | H01R 43/16 | 29/33 M |
| 6,053,780 | A * | 4/2000 | Ono | H01R 4/34 | 439/810 |
| 6,452,101 | B1 * | 9/2002 | Haramaki | H01B 5/00 | 174/128.1 |
| 7,413,488 | B2 * | 8/2008 | Matsumura | H01H 85/044 | 439/874 |
| 9,159,474 | B2 * | 10/2015 | Ito | H01R 43/0207 | |
| 9,763,625 | B2 * | 9/2017 | Laughner | A61B 5/7253 | |
| 9,887,477 | B1 * | 2/2018 | Reed | H01R 43/16 | |
| 10,944,228 | B2 * | 3/2021 | Steinberg | C23C 24/04 | |
| 11,942,748 | B2 * | 3/2024 | Mathews | H01R 4/02 | |
| 12,126,101 | B2 * | 10/2024 | Blakborn | H01R 11/09 | |
| 2009/0078447 | A1 * | 3/2009 | Brantsch | H01R 11/12 | 174/128.1 |
| 2011/0198122 | A1 * | 8/2011 | Sagawa | H01R 4/023 | 174/84 R |
| 2015/0064989 | A1 * | 3/2015 | Hirasawa | H01R 4/305 | 439/781 |
| 2016/0276758 | A1 * | 9/2016 | Warashina | A47B 39/00 | |

FOREIGN PATENT DOCUMENTS

| | | | | |
|---|---|---|---|---|
| GB | 234374 | A * | 5/1925 | H01R 11/12 |
| GB | 2276046 | A * | 9/1994 | H01R 9/20 |

* cited by examiner

HIGH VOLTAGE CABLE INTEGRATED END CONNECTOR SYSTEM THAT ELIMINATES TERMINAL

FIELD

The present application generally relates to cable connection systems for electrical cables and, more particularly, to a high voltage high current electrical cable having an integrated cable connection system that eliminates a terminal.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In today's electrified vehicles, improving overall vehicle efficiency is a common design target. One manner in which vehicle manufacturers meet this target is to reduce the size and weight of certain vehicle components. In the area of electrification, there is a desire to reduce the size and weight of cable connection arrangements, such as for junction boxes, modules and the like. Conventional electrical cable terminal connection systems often drive a necessary larger size of these connection arrangements in order to accommodate the metal plate connector terminals of such conventional cables. In addition to driving the larger size of the mating components, these conventional cable terminals also add weight to the electrical cables. Accordingly, while such conventional electrical cable terminals do work for their intended purpose, there exists an opportunity for improvement in the relevant art.

SUMMARY

According to one example aspect of the invention, a high voltage high current electrical cable is provided. In one exemplary implementation, the electrical cable includes: a plurality of strands forming the electrical cable, wherein the electrical cable includes a first end and a second opposite end, the first end including a first portion and a second portion, the second portion forming a distal end of the first end of the cable; wherein the first portion of the cable is encapsulated in an insulation material and the second portion is free of the insulation material; wherein the plurality of strands in the second portion are sized and shaped and fused together into a lower integrated connection terminal having a slot at the distal end, an upper face and an opposed lower face; an upper cover plate is configured to be positioned over the lower integrated connection terminal in contact with the upper face, the upper cover plate having an upper surface adapted to receive a fastener in contact therewith; and wherein the lower integrated connection terminal consists of the fused together plurality of strands such that the first end of the electrical cable is free from a separate lower connection terminal component being welded to an end of the first portion of the cable.

In some implementations, the slot of the lower integrated connection terminal includes first and second longitudinally extending portions each having a free end that forms the distal end.

In some implementations, the free ends of the first and second longitudinally extending portions are bent upward at the distal end thereby forming a retaining feature for the upper cover plate.

In some implementations, the upper cover plate includes a U-shape with downwardly extending side portions configured to extend over opposed lateral side faces of the lower integrated connection terminal.

In some implementations, the plurality of strands are fused together via welding. In some implementations, the plurality of strands are fused together via ultrasonic welding.

In some implementations, the lower integrated connection terminal comprises a flat configuration having flat upper and lower opposed faces, with the flat lower face adapted for connection to a receiving component. In some implementations, the lower integrated connection terminal forms a plate-like structure consisting only of the fused together plurality of strands.

In some implementations, the electrical cable further includes a third portion after the first portion and before the second portion, the third portion being free of the insulation material and including the plurality of strands in an unfused state; wherein the third portion includes a circular shape in cross-section, and the second portion includes a square or rectangular shape in cross-section having at least flat and parallel upper and lower opposed faces.

In some implementations, the electrical cable further includes comprising a transition portion of the plurality of strands between the third portion and the second portion; wherein an average height of the transition portion is lower than a height of the first and third portions and greater than a height of the flat and parallel upper and lower opposed faces of the second portion.

Further areas of applicability of the teachings of the present application will become apparent from the detailed description, claims and the drawings provided hereinafter, wherein like reference numerals refer to like features throughout the several views of the drawings. The claims form an integral part of the disclosure. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

The present disclosure will become more fully understood from the detailed description and the accompanying drawings, given purely by way of non-limiting example, wherein.

DESCRIPTION

Figure 1:
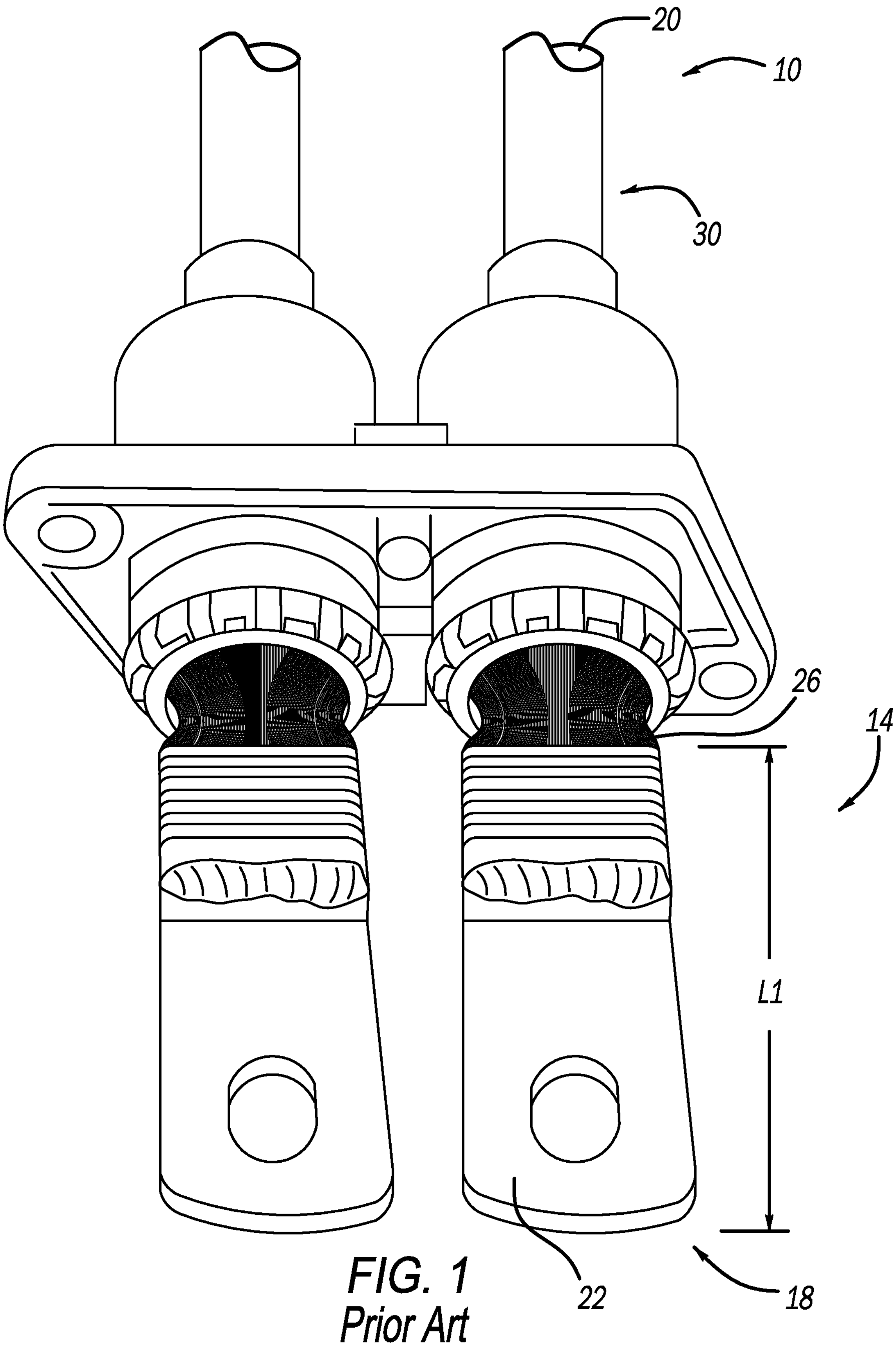
FIG. 1 Prior Art
FIG. 1 illustrates a prior art high voltage high current electrical cable connection system having a metal plate welded to an end of strands of the cable.

As previously discussed, conventional high voltage electric cable connector systems have a terminal at a connection end thereof. For example, the prior art connection system 10 shown in FIG. 1 includes a first end 14 having a conventional terminal arrangement 18, and a second opposite end 20. This terminal arrangement 18 includes a separate and distinct terminal plate 22 that is typically welded to an end portion of the plurality of strands 26 that make up the stranded wire cable 30. As can be seen in FIG. 1, this conventional terminal arrangement 18 requires a notable length L1 to accommodate the connection end of the plate 22 as well as the opposite end of the plate that is welded to the strands 26. This length L1 requires a correspondingly large connection area in a receiving junction box 38 or power inverter module or the like, as shown for example in FIG. 2, which adds weight to the vehicle. Moreover, this terminal arrangement 18 requires additional manufacturing steps to handle and secure the terminal plate 22 to the cable 30, which results in a more complex and less efficient manufacturing process. It has also been observed that with this conventional terminal arrangement 18, one or more strands 26A of the plurality of strands can become loose or break free at one end and be push back during the assembly process into the junction box 38, which can potentially result in a manufacturing and/or assembly defect situation. The terminal 22 can be coupled to the junction box or the like 38 with a fastener 42, as shown in FIG. 2.

Accordingly, improved high voltage high current electric cable (hereinafter, "cable") connection systems are presented herein. These systems eliminate the distinct terminal plate 22 resulting in a lighter weight and more compact connection arrangement at the first end of the cable. In addition, with the terminal plate being eliminated, the manufacturing process is less complex and more efficient due to the elimination of an operation. Moreover, the first end of the improved connection systems is more compact (shorter length) thereby requiring less space in a mating component, such as junction box 38, which allows for further weight reduction through the use of a smaller junction box 38.

Figure 2:
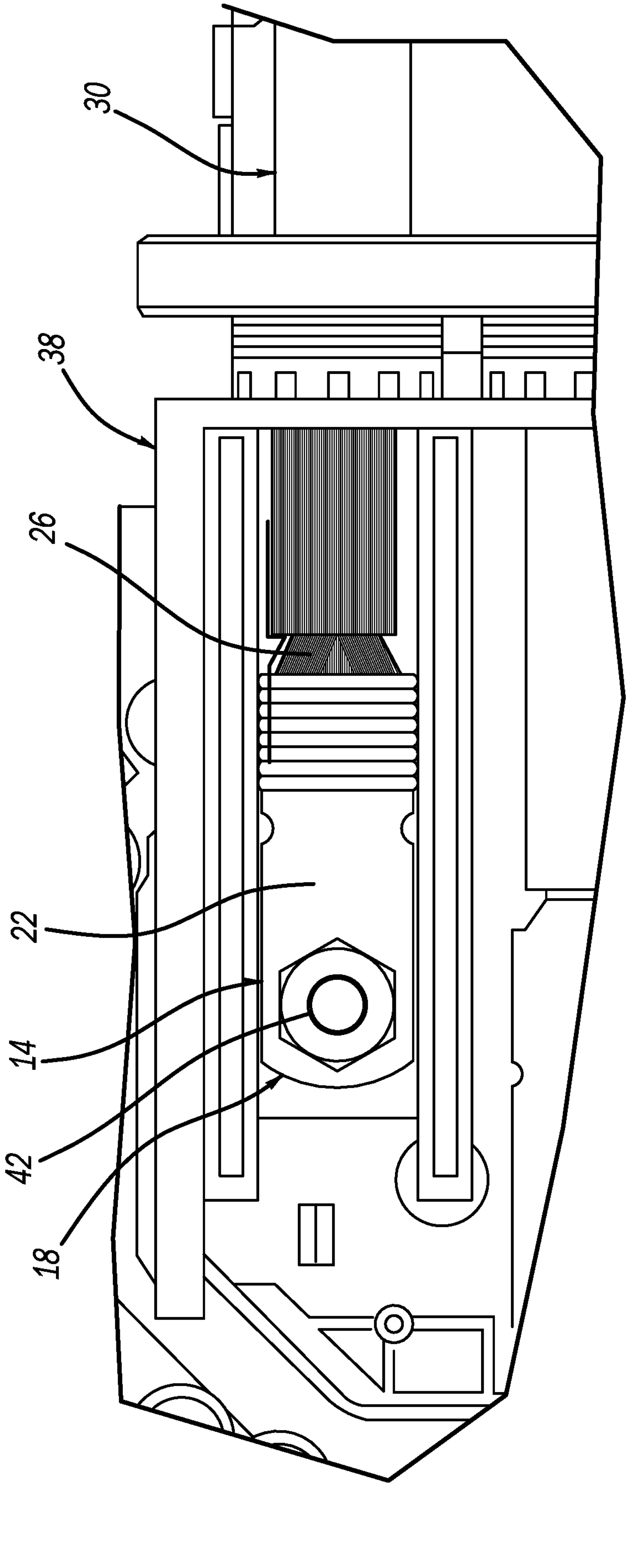
FIG. 2 Prior Art
FIG. 2 illustrates the electrical cable connection system of FIG. 1 coupled to a junction box and having a loose wire strand detached from the welded area resulting in a potential defect.
Figure 3:
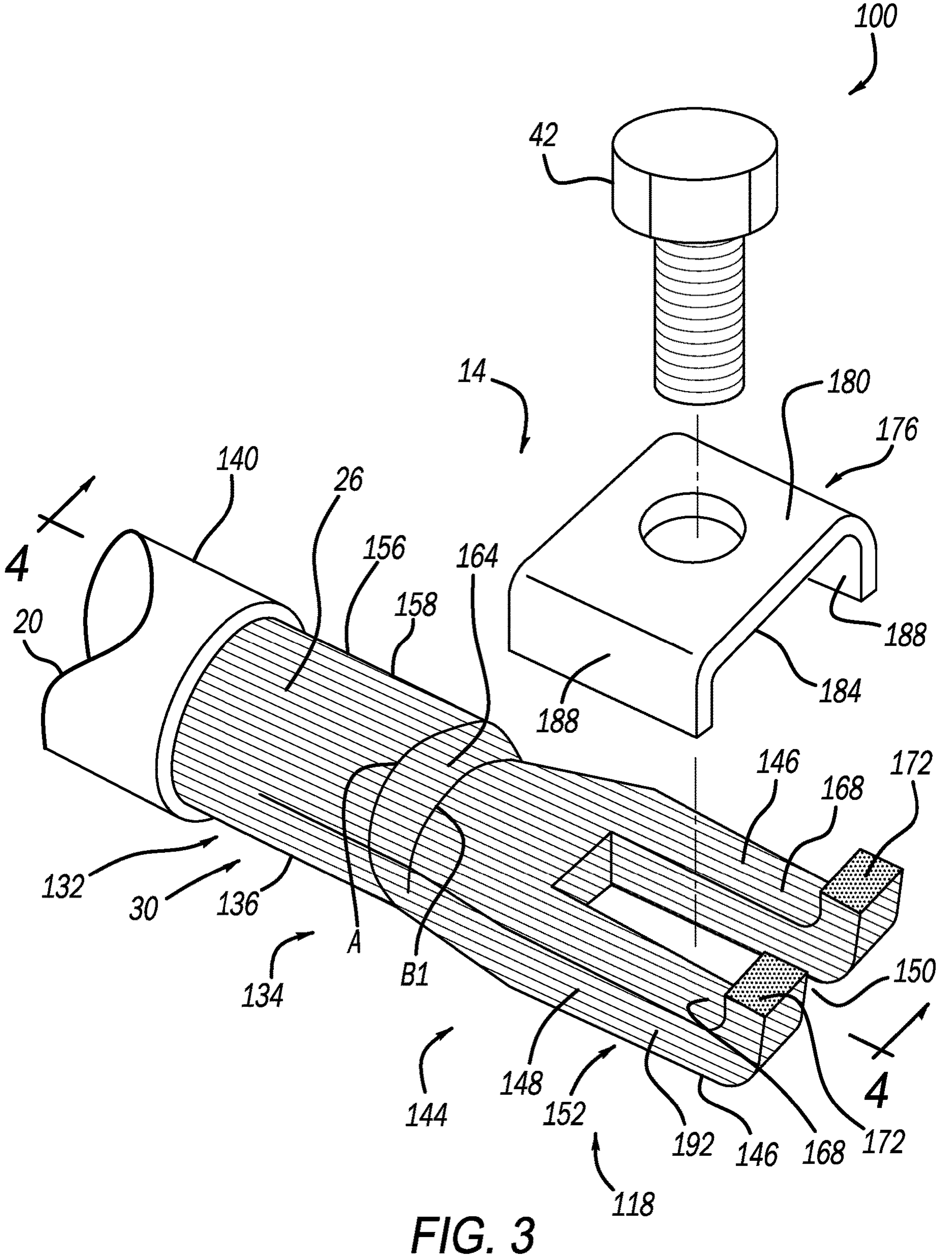
FIG. 3 illustrates an integrated electrical cable connection system having an integrally formed connection area at a first end of the cable and a cover plate according to the principles of the present application.

Turning now to FIG. 3 and with continued reference to FIGS. 1 and 2, one example implementation of the improved connection system is shown at reference numeral 100. For components similar to or the same as system 10, like reference numerals will be utilized. Connection system 100 incudes the plurality of strands 26 that make up the electric cable 30. The plurality of strands 30 are encapsulated in insulation 140, as is known in the art. Connection system 100 also includes an improved connection arrangement 118 at the first end 14, where the distinct terminal plate 22 has been eliminated in favor of an integral wire strand based connection area 144, which is configured to receive the upper cover plate 176. The first end 14 can include a first portion 132 and a second portion 134. In general, the first portion 132 is covered in insulation 140 and the second portion is free of the insulation 140. In general, the first portion 132 ends at the beginning of the second portion 134. In this regard, the first portion 132 can include a distal end 136 that ends at the end of the insulation 140 or extends slightly beyond the insulation 140, as shown in FIG. 3.

The improved connection arrangement 118 includes area 144 where the plurality of strands 26 are sized and shaped and/or configured into a flat or substantially flat or planar connection area 144. This connection area 144 has an overall general rectangular or substantially rectangular shape 148, although other shapes are contemplated. The connection area structure 144 also includes flat or substantially flat upper and lower faces or surfaces 146. In this flat connection area 144, the strands 26 are also sized and shaped to from a slot 150 configured to receive the fastener 42 therethrough. In this example implementation, the slot 150 can be formed by shaping the strands 26 without any post processing cutting or drilling, etc. to form the slot 150, besides the fusing that is discussed immediately below. In the flat connection area 144, the plurality of strands 26 are fused together to form essentially a fused structure like a weld nugget or a plate-like connection structure 152 having the slot 150. In some implementations, the fusing occurs by ultrasonic welding where there are not any additional materials utilized to fuse together the plurality of strands 26 of fused connection structure 152.

It should be appreciated that the plurality of strands 26 used to form the integrated wire based connection area 144 (and fused connection structure 152) are the same strands 26 extending throughout and forming cable 30. In other words, there are not any additional or other strands used to make connection structure 152. For example, for a given length of cable 30, the insulation 140 is removed from the second portion 134 of the first end 14 to expose the wire strands 26 in their original circular or other shape 156 within the insulation 140 at area 158. At least a portion of a length of the exposed wire strands 26 are then sized and shaped and/or configured into the flat or substantially flat or planar connection area 144. Subsequently or concurrently, the strands 26 are fused together in the connection area 144 to form the fused connection structure 152 with slot 150. As can be appreciated, the plurality of wire strands 26 remain continuous through the entire exposed area of the strands 30 from distal end 160 through the fused connection area 144 and to and into the insulation 140 of the first portion 132.

In some implementations, there is a transition area 164 from the plurality of strands 26 at location 158 in their typical circular shape in cross section 156 to the connection area 144. For example only, this transition area could take place from point A to point B1, which in this example represents the start of the fused connection structure 152. In some implementations, the transition area 164 could be partly or fully fused in the same manner as the connection area 144.

Figure 4A:
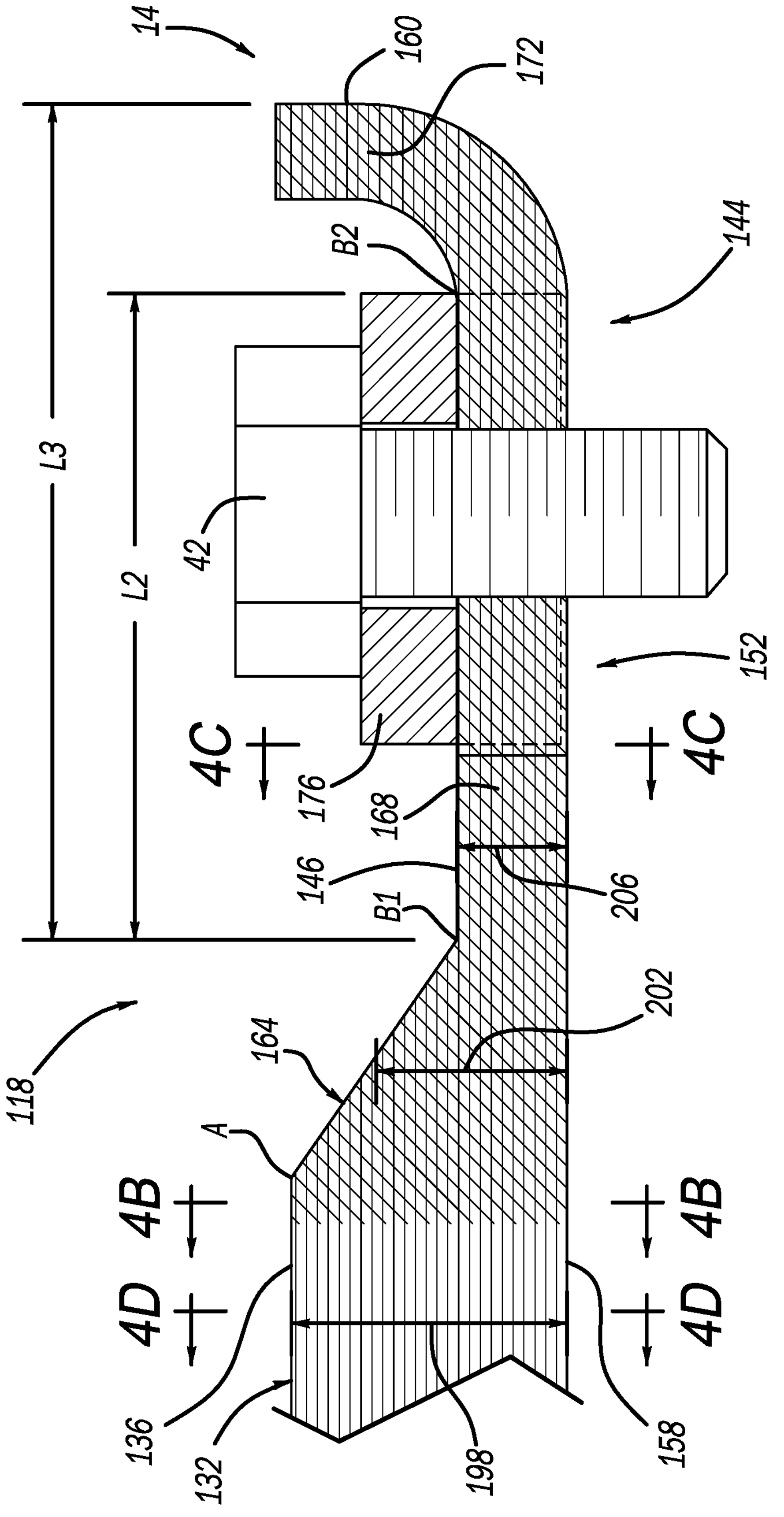
FIG. 4A illustrates a longitudinal section through FIG. 3 showing areas of the plurality of strands that make up the cable that are and are not fused together according to the principles of the present application.

In the example implementation shown in FIGS. 3 and 4A, the fused connection area 144 or structure 152 can alternatively include only the overall rectangular shaped structure 148 having the length L2 extending from location B1 to location B2. In this example, the length L2 is less than the prior art terminal connection length L1. In some implementations, the fused connection structure 152 may include a length up to L3 extending from location B1 to the distal end 160. In some implementations, the length L3 is less than the prior art length L1.

With continued reference to FIGS. 3 and 4A, the slot 150 will now be discussed in greater detail. As previously mentioned, the overall rectangular shape 148 can include the internal slot 150. The slot 150 can be formed by first and second longitudinally extending portions or legs 168 that are free at the distal end 160. In this example, the slot is also open or free at distal end 160. In some implementations, the free ends of the two leg portions 168 can include integrally formed upwardly extending portions or projections 172 at the distal end 160. These upwardly extending portions 172 aide in retaining the fused together plurality of strands during assembly to a mating component and can also serve as a retention feature to prevent longitudinal sliding of the cover plate 176 (discussed further below). The upwardly extending portions 172 together with the remaining portions of legs 168 can form an L shape configuration when viewed from the side, as shown for example in FIGS. 3 and 4A.

With continued reference to FIGS. 3 and 4A, the cover plate 176 will now be discussed. Cover plate 176 is configured to be an upper plate received over the upper face 146 of fused connection structure 152 in connection area 144. Cover plate 176 includes an upper surface 180 configured to receive fastener 42 and an opposed lower surface 184 configured to mate with upper face 146 of connection area 144. The cover plate 176 can also include downwardly extending sides 188 such that the cover plate, in its installed position, can include an up-side-down U shape. The sides 188 are configured to extend over opposed lateral sides 192 of connection area 144 when plate 176 is installed over connection area 144, as is shown in FIG. 4A. In some implementations, cover plate 176 is retained over connection area 144 with only the fastener 42. In other implementations, the cover plate is fused to the connection area 144, such as via ultrasonic welding, while also receiving fastener 42.

With particular reference to FIG. 4A, the first end 14 of cable 30 can include various different heights of the plurality of strands 26 form the first portion 132 though the flat connection area 144 of connection structure 152. For example, in some implementations, the distal end 136 of first portion 132 can include a first height 198, the transition area 164 can include a second, average height 202 and the connection area 144 can include a third height 206. In this implementation, the second average height is greater then the third height and less than the first height.

Figure 4B:
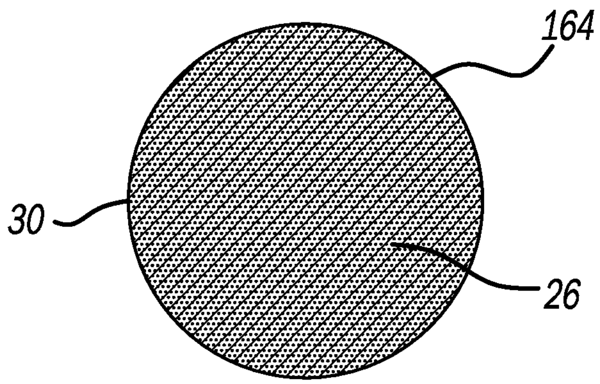
FIGS. 4B-4D illustrate cross sectional views of FIG. 4A in multiple different locations at the first end of the electrical cable according to the principles of the present application.
Figure 4C:
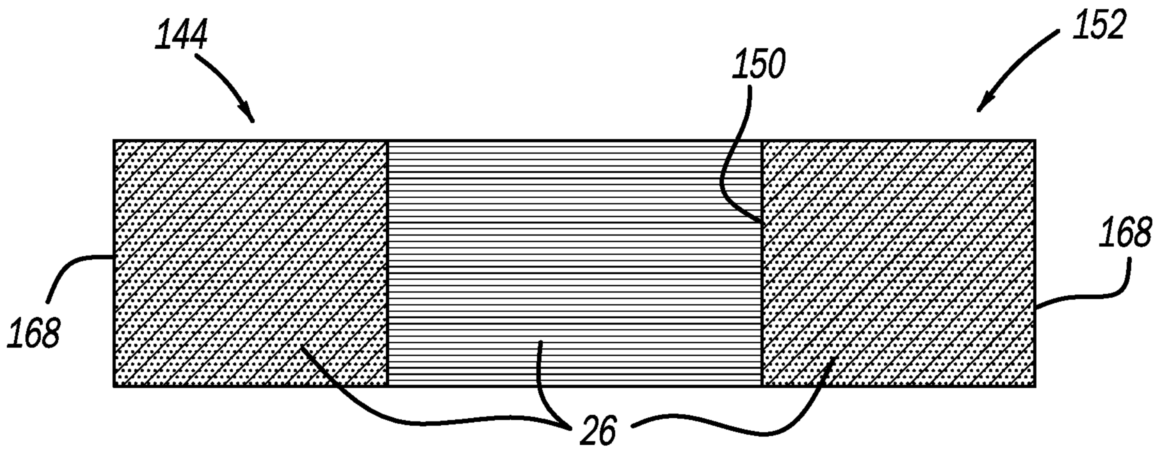
Figure 4D:
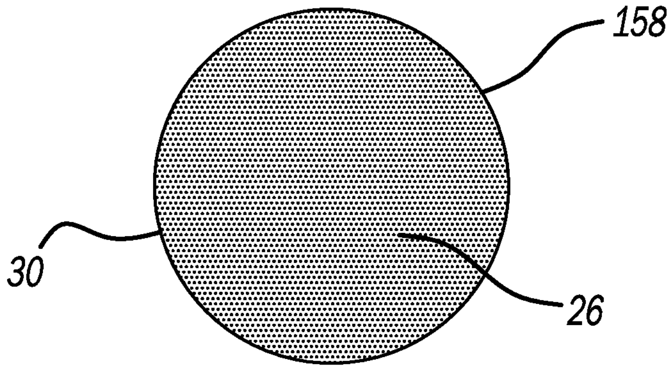

Turning now to FIGS. 4B-4D, and with continuing reference to FIGS. 3 and 4A, various sectional views are shown to visually describe areas of the first end 14 of cable 30 that are and are not fused together in the example implementation shown in FIG. 3. FIG. 4B represents a longitudinal section taken though first end 14 from before area 158 though distal end 160. Here it can be seen that the entire fused area of the first end 14 includes transition area 164 and connection area 144 including the upward extending portions 172. The sectional views shown in FIG. 4B of an end of the fused transition area 164 can be compared and contrasted to the unfused area 158 of FIG. 4D proximal to the distal end 136 of first portion 132. FIG. 4C represents a sectional view through the integrated fused connection structure 152 including upwardly extending portions 172.

The terminology used herein is for the purpose of describing particular example embodiments only and is not intended to be limiting. As used herein, the singular forms “a,” “an,” and “the” may be intended to include the plural forms as well, unless the context clearly indicates otherwise. The term “and/or” includes any and all combinations of one or more of the associated listed items. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

It will be appreciated that the term “controller” or “control system” (as well as “module” and “unit”) as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

Unless specifically stated otherwise as apparent from the above discussion, it is appreciated that throughout the description, discussions utilizing terms such as “processing” or “computing” or “calculating” or “determining” or “displaying” or the like, refer to the action and processes of a computer system, or similar electronic computing device, that manipulates and transforms data represented as physical (electronic) quantities within the computer system memories or registers or other such information storage, transmission or display devices.

Some portions of the above description may present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A high voltage high current electrical cable comprising:

a plurality of strands forming the electrical cable, wherein the electrical cable includes a first end and a second opposite end, the first end including a first portion and a second portion and a third portion, the second portion forming a distal end of the first end of the cable;

wherein the first portion of the cable is encapsulated in an insulation material and the second portion is free of the insulation material;

wherein the plurality of strands in the second portion are sized and shaped and fused together into a lower integrated connection terminal having a slot at the distal end, an upper face and an opposed lower face;

wherein the third portion is after the first portion and before the second portion, the third portion being free of the insulation material and including the plurality of strands in an unfused state;

a transition portion of the plurality of strands between the third portion and the second portion;

an upper cover plate is configured to be positioned over the lower integrated connection terminal in contact with the upper face, the upper cover plate having an upper surface adapted to receive a fastener in contact therewith;

wherein the lower integrated connection terminal consists of the fused together plurality of strands such that the first end of the electrical cable is free from a separate lower connection terminal component being welded to an end of the first portion of the cable; and wherein the lower face forms a bottom surface of the second portion which aligns with a corresponding bottom surface of the third portion and the transition portion.

2. The electrical cable of claim 1, wherein the slot of the lower integrated connection terminal includes first and second longitudinally extending portions each having a free end that forms the distal end.

3. The electrical cable of claim 2, wherein the free ends of the first and second longitudinally extending portions are bent upward at the distal end thereby forming a retaining feature for the upper cover plate.

4. The electrical cable of claim 3, wherein the upper cover plate includes a U-shape with downwardly extending side portions configured to extend over opposed lateral side faces of the lower integrated connection terminal.

5. The electrical cable of claim 1, wherein the plurality of strands are fused together via welding.

6. The electrical cable of claim 5, wherein the plurality of strands are fused together via ultrasonic welding.

7. The electrical cable of claim 1, wherein the lower integrated connection terminal comprises a flat configuration having flat upper and lower opposed faces, with the flat lower face adapted for connection to a receiving component.

8. The electrical cable of claim 1, wherein the third portion includes a circular shape in cross-section, and the second portion includes a square or rectangular shape in cross-section having at least flat and parallel upper and lower opposed faces.

9. The electrical cable of claim 8, wherein an average height of the transition portion is lower than a height of the first and third portions and greater than a height of the flat and parallel upper and lower opposed faces of the second portion.

10. The electrical cable of claim 1, wherein the lower integrated connection terminal forms a plate-like structure consisting only of the fused together plurality of strands.

* * * * *